FIG-4

May 12, 1970  W. FUCHS  3,511,595
METHOD OF REMOVING CARBON DIOXIDE AND WATER VAPOR FROM AIR
Filed May 18, 1967  7 Sheets-Sheet 6

INVENTOR.
WARREN FUCHS
BY
ATTORNEY

United States Patent Office 3,511,595
Patented May 12, 1970

3,511,595
METHOD OF REMOVING CARBON DIOXIDE AND WATER VAPOR FROM AIR
Warren Fuchs, Syosset, N.Y., assignor to The Treadwell Corporation, New York, N.Y., a corporation of New York
Filed May 18, 1967, Ser. No. 639,526
Int. Cl. B01d 53/04
U.S. Cl. 23—4                                        11 Claims

ABSTRACT OF THE DISCLOSURE

Method of removing carbon dioxide from gases containing carbon dioxide and water vapor, such as a submarine atmosphere, comprising contacting said gases with an alkali metal carbonate supported on a large specific surface area carrier at a temperature not above about 100° F. with resultant formation of the bicarbonate, heating the bicarbonate to a temperature sufficient to decompose the bicarbonate to the carbonate, water and carbon dioxide, compressing the evolved carbon dioxide and dissolving it in an aqueous medium and thereafter cooling the heated carbonate to absorption temperature by blowing relatively dry cold air thereover.

BACKGROUND OF THE INVENTION

The problem of removing carbon dioxide from air is a serious one, particularly in the case of submarines and other enclosed structures which cannot be supplied with outside air. Prior to the development of nuclear submarines, chemical absorbents were commonly used, such as soda lime and the like, the carbon dioxide reacting with them permanently and not being regenerated and removed as such. For the short submersion periods which were possible with submarines using battery power when submerged, such systems were satisfactory.

With the advent of nuclear submarines, which can operate submerged for weeks or months, the use of a chemical which unites permanently with carbon dioxide was not practical. It, therefore, became necessary to attempt to find some system in which the carbon dioxide taken from the air could be regenerated and disposed of. Therefore, a system was developed in which carbon dioxide from the air was absorbed by a solution of an amine, with the amine solution subsequently being regenerated by heating and the resulting desorbed carbon dioxide then being discharged by compression and discarded into the ocean.

An important disadvantage of the amine solution system, however, was its inability to work practically at carbon dioxide concentrations of less than 1.0 volume percent in the foul air. This limitation derives mainly from the nature of absorption in a solution medium, wherein the diffusional resistance through the liquid phase is an important component of the operation, and reflecting on time for absorption and size of apparatus.

The accumulation of experience on submarines with amine solution systems has shown on the one hand the desirability to work in the range of 0.5 volume percent $CO_2$ as regards crew comfort and health but on the other hand the inability of the amine solution systems to work to lower than about the 1.0 volume percent $CO_2$ range.

The amines and other organics have been tried in a thin layer on high specific surface solid state type of systems but have been found subject to bleeding (physical losses by carry over or entrainment as vapor or liquid or solid) and/or to oxidation or other types of deterioration losses.

SUMMARY OF THE INVENTION

In the present invention carbon dioxide and water vapor are removed from atmospheres containing them, such as those in a submarine, by reacting with potassium carbonate or other alkali metal carbonate coated on or impregnated in carrier solids of enormous specific surface, for example particles of alumina gel. The solid bed absorbers are very compact. The required portion of carbon dioxide together with its chemically equivalent water reacts with the alkali metal carbonate absorbent material to form potassium bicarbonate, while a parallel portion of excess water vapor of the air is in turn physically adsorbed by the carrier solid itself. The absorption is controlled at low temperatures, for example 40° F. to 100° F., which permits reducing the carbon dioxide and water vapor contents to the desired degree. Air passing through the absorber or absorption bed is then returned to the submarine, with only a small amount of its carbon dioxide and water vapor content.

When the absorber has taken up all of the carbon dioxide which it usefully can, the air from the submarine is switched to a second absorber or absorption bed. It is desirable to have a number of beds so that continuous operation can cycle them so that one bed is always absorbing. In a more specific aspect of the present invention, an apparatus or system with a number of beds, usually four, operating on a particular cycle in a very compact space is included, even though in its broader aspects the present invention should be considered as a process one.

For the purpose of regeneration for reuse, the bed is heated to a temperature somewhat over 200° F. and the carbon dioxide and its companion water, both the chemically absorbed and the physically adsorbed water, is driven off. These evolved gases are obtained mixed with the small amount of oxygen and nitrogen which was present in the interstices between the pellets or particles in the absorber. This carbon dioxide bearing gas mixture is then cooled for removal of the bulk of its water content and is then compressed and subsequently scrubbed with cold or ambient water, such as sea water. The scrubbing water, of course, does not dissolve any large portion of the small amount of oxygen and nitrogen which accompanies the carbon dioxide, and these are returned to the atmosphere in the submarine. The use of sea water is not essential; it is one of a number of possible aqueous liquids which are expendable. Another, for example, would be water from baths, dishwashing and the like. The feature of importance is that the aqueous scrubbing liquid is one which can be dispensed with and may, therefore, be considered as expendable water.

The bed which has been heated to drive off $CO_2$ is then cooled down with recycled product air.

It is important for this cooling operation to use air that is at least somewhat dried, for example recycle product air, to avoid excessive water pickup in the bed during the cooling operation as the bed becomes successively cooler. For example, the foul air in the submarine may be in the range of 85° F. and 50% relative humidity, or therefore carrying water in the range of 2.0 volume percent $H_2O$, or thereby carrying roughly 4 times as much water vapor as the 0.5 volume percent $CO_2$ level. The excess water above the 0.5 volume percent of chemical equivalent of the $CO_2$ will tend to load the bed by physical adsorption onto the carrier solid. The subsequent regeneration heat load and, therefore, heating time is in consequence, of course, increased by the increased physical adsorption load. Therefore, it is desirable not to have to suffer more physical adsorption water load than that equivalent to the original quantity which unavoidably accompanies the $CO_2$ entering for the absorption operation itself. This original water quantity could in turn be reduced somewhat by condensation or drying via sufficiently deep precooling or preabsorption of the foul air being supplied to the beds, but such treatment in turn represents additional operation and therefore additional equipment and, of course, additional costs. In order to limit the physical water load to that equivalent to the original quantity accompanying the $CO_2$ entering for absorption, it is essential to avoid the use of wet air during cooling, and therefore dried air, such as recycle air, is preferred for the precooling of the regenerated beds.

In a preferred modification of the absorption cycle or phase, four beds or absorbers are provided and an operating cycle of suitable length, for example 7.5 minutes, is observed. The total cycle, of course, is 30 minutes, and this has an important advantage because it permits two consecutive 7.5-minute heating cycles, which is desirable as excessive heat can be damaging to an absorber, and of course, the rate of transfer of heat by the indirect means which are used, for example electrically heated panels, cannot transfer heat as rapidly as can be done in the cooling cycle or the absorption cycle where gas contacts the individual particles or pellets in the absorber. In its broader aspects the process of the present invention is, of course, not limited to an arrangement of absorbers to be used in sequence which permits two heating cycles or a heating cycle of twice as long time. However, the advantages of giving a longer time for the heating of the beds are so great that this constitutes a preferred modification of the invention and in a narrower aspect is, therefore, included.

In the apparatus phase a very compact, four-bed or four-absorber apparatus is included, with a system of plenums so arranged that gases, either on the absorption cycle or cooling cycle, pass sideways through absorbers having relatively greater heights and lengths when compared with the width through which the gases pass. It is preferred to use flat valves which can be actuated in proper sequence very easily and very quickly, although of course other valves may be used. In the apparatus phase chilled water, for example water refrigerated to about 40° F. or 45° F., is circulated through coils with fins. This constitutes a very compact structure, and both air from the submarine entering absorption cycles and recirculating air for cooling down an absorption cycle and recirculating air for cooling down an absorber which has lost its carbon dioxide by heating up can be cooled by what is essentially a unitary structure which simplifies design and lends itself to compactness. Cooling down a hot absorber necessarily also produces exit air which at the beginning is quite hot, and this can also be cooled by the same cooling structures, which saves equipment elements and makes for a maximum compactness, which is always a desirable feature in a submarine.

In general, while the present invention is not particularly concerned with how motive energy is provided to the air passing through the absorbing beds or to the air from the absorber which is returned to the submarine, this may be effected by the submarine's own circulating fans. Essentially, the processes are exactly the same, but from the standpoint of an apparatus organization or system in some cases the use of some of the equipment already in the submarine presents a practical advantage. Such a more particular organization is, therefore, also included in one of the more specific aspects of the invention.

The use of the present invention in removing carbon dioxide from air in submarines and other enclosed spaces is not the only field of utility of the invention although by far the most important single one at the present time. Essentially, we can consider that in such uses the object of the process and apparatus of the invention is to remove carbon dioxide and recirculate air of suitable carbon dioxide content. The invention, however, is also useful in situations where air which has moderate amounts of carbon dioxide is treated to absorb the carbon dioxide and recover it in a more concentrated form. For example, there are many processes, such as fermentation, some secondary sewage treatments, and the like, in which carbon dioxide is given off in concentrations that make its recovery economically unattractive. The present invention can be used to absorb the carbon dioxide and to give it off again in a much more concentrated form. In such uses the primary purpose is not so much to get rid of carbon dioxide in an atmosphere but to concentrate carbon dioxide economically for recovery.

Because of the great practical importance of the present invention in removing carbon dioxide from air which is to be breathed, especially in nuclear submarines, the remainder of the description of the invention will be in terms of this preferred and most important use, but it should be understood that other uses, such as those just mentioned, are also included. It is an advantage of the invention that it operates very efficiently and can, therefore, be used in a number of fields.

BRIEF DESCRIPTION OF THE DRAWINGS

FIG. 6 is a cross section of FIG. 4 along the line 6—6.

DESCRIPTION OF PREFERRED EMBODIMENTS

Figure 1:
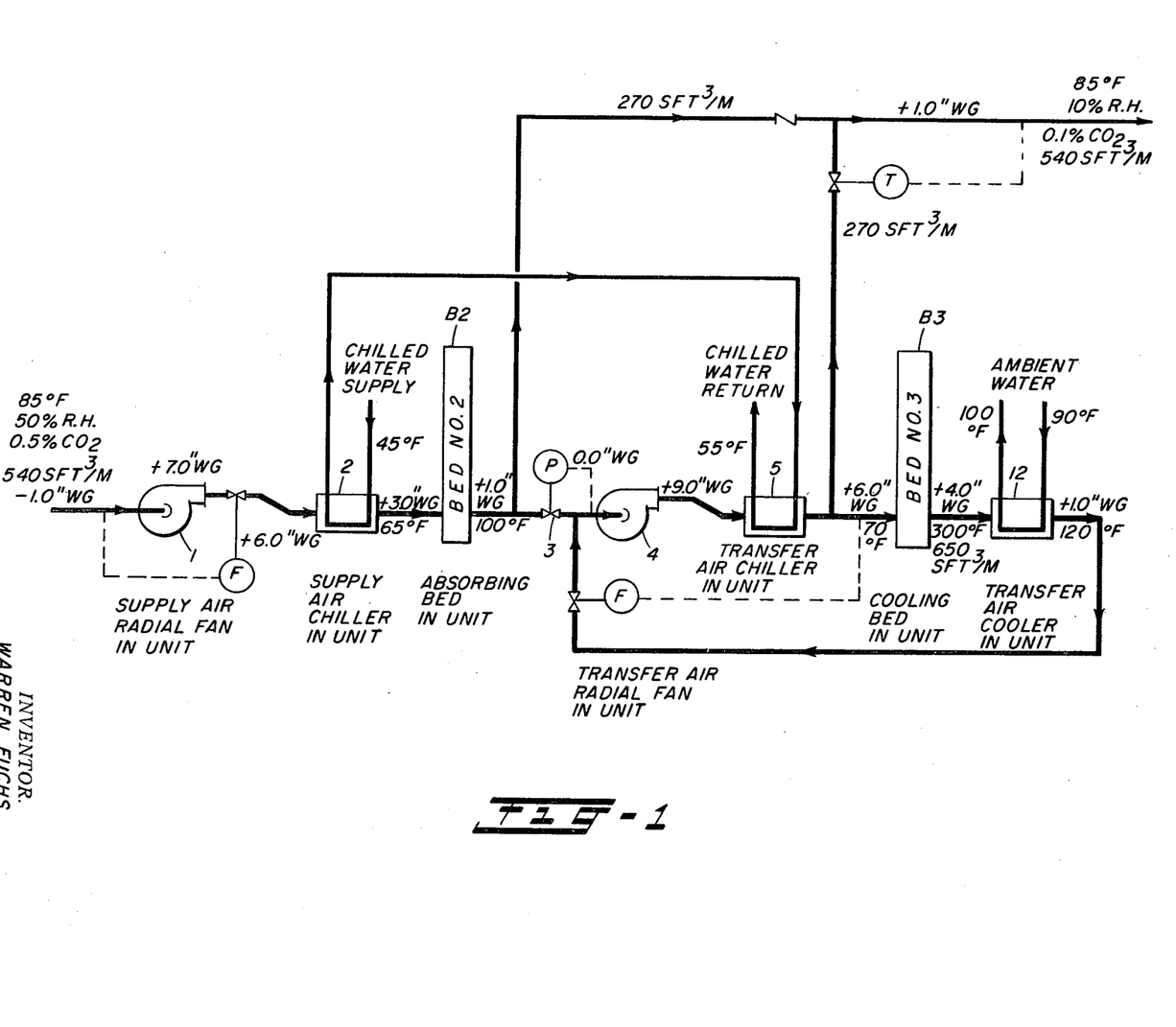
FIG. 1 is a flow sheet of the carbon dioxide absorption part of the invention.
Figure 9:
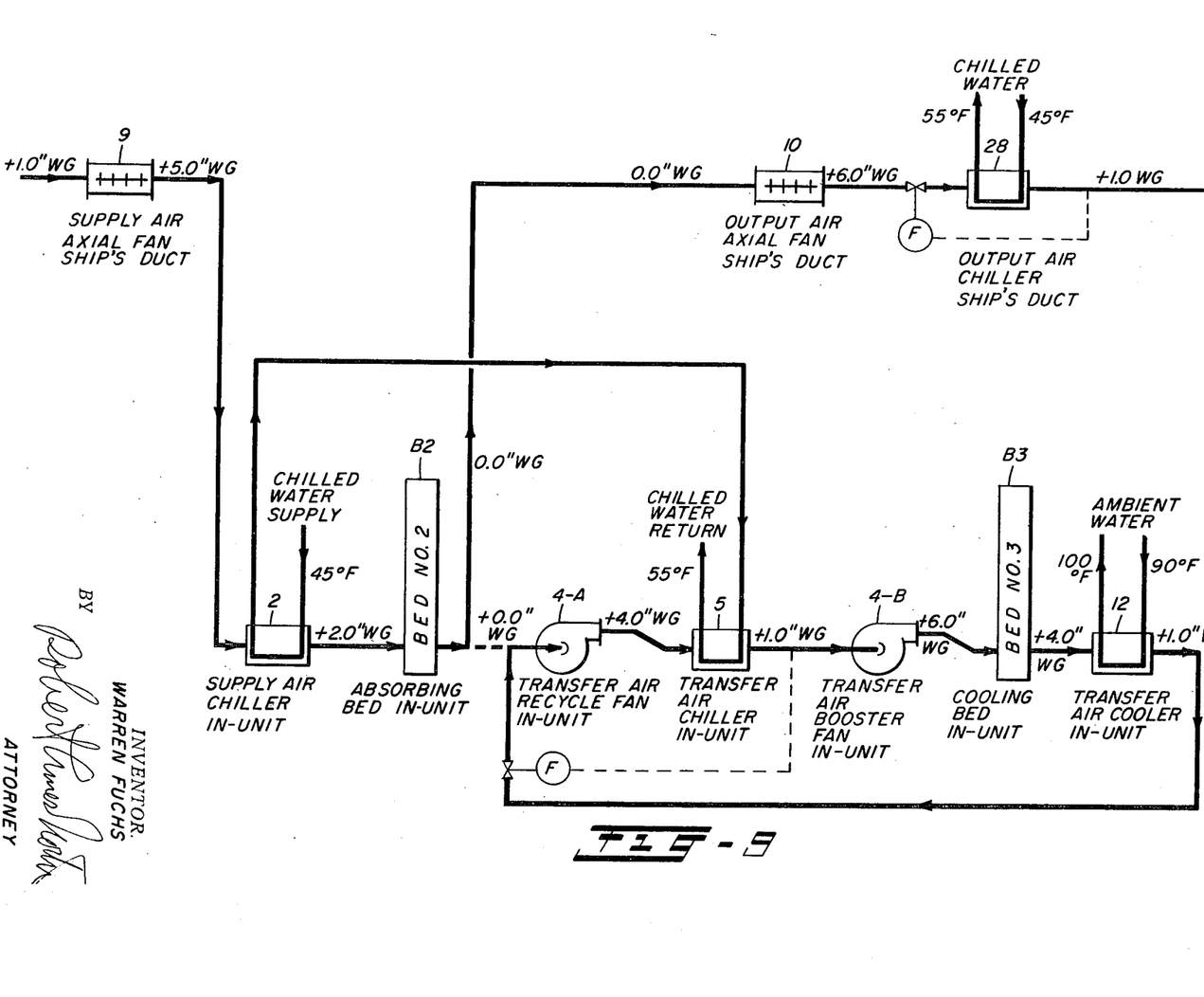
FIG. 9 is a different modification in the absorption phase of the invention.

The drawings will be described in conjunction with the most important single field, namely the removal of carbon dioxide from the atmosphere of a submarine. In FIG. 1 a portion of the atmosphere in a submarine enters at the left, as shown by the arrow on the drawing abbreviations are used as follows: RH for relative humidity and WG for water gauge. In the latter case a pressure is shown in inches of water above atmospheric or in other words the pressure in inches of water which would be shown by a gauge. Two variants are possible and are shown in the drawings. FIG. 1 uses an independent centrifugal blower 1. In FIG. 9 a portion of the supply air from the submarine's axial atmosphere circulating fans 9 is used.

Figure 3:
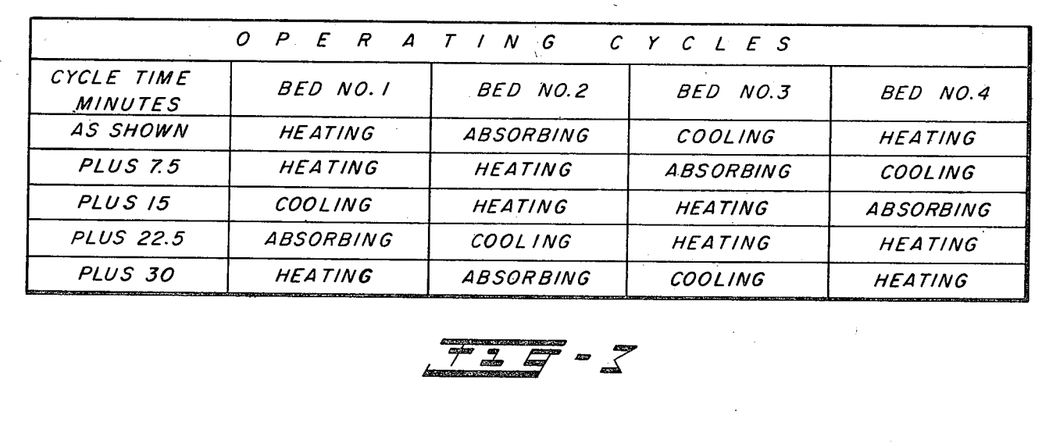
FIG. 3 is a table of operating cycles.
Figure 4:
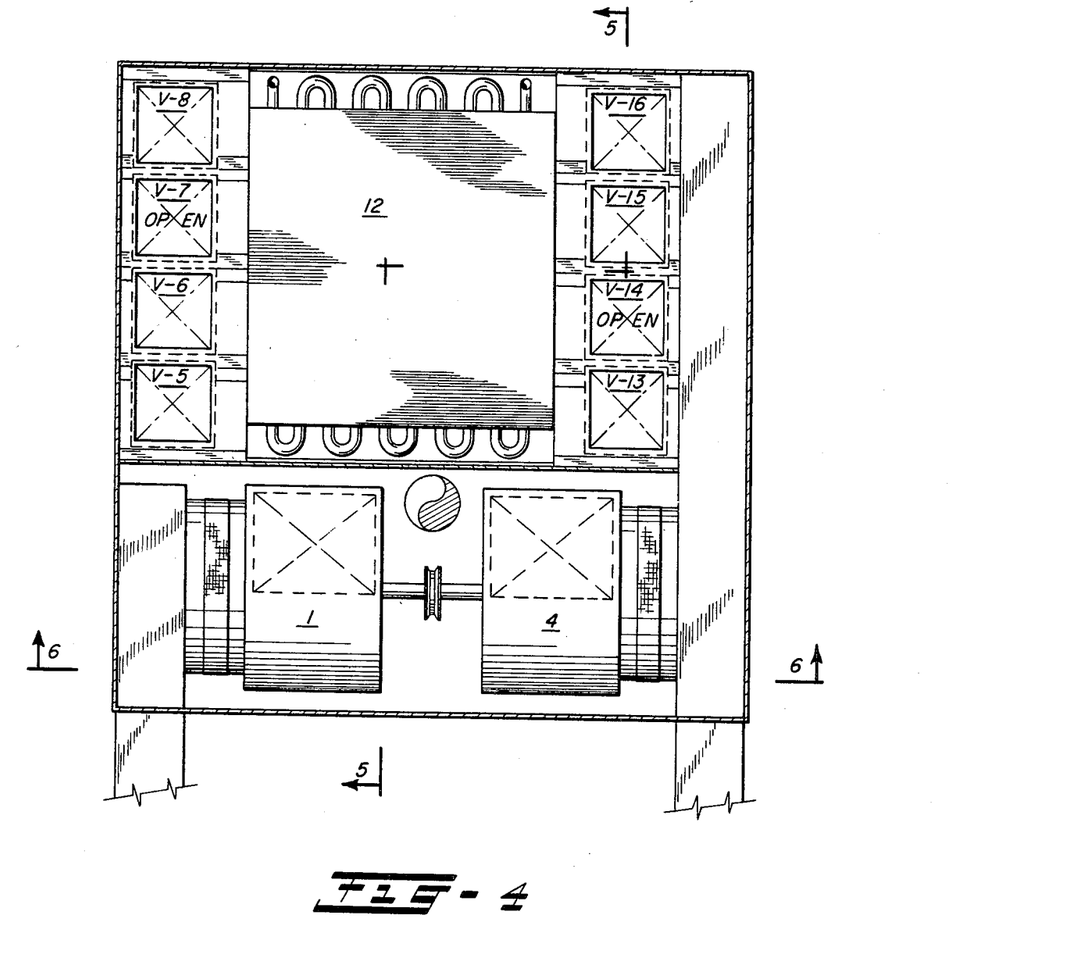
FIG. 4 is a plan view of absorption and rejection apparatus involving four absorbing beds in accordance with FIG. 3.
Figure 5:
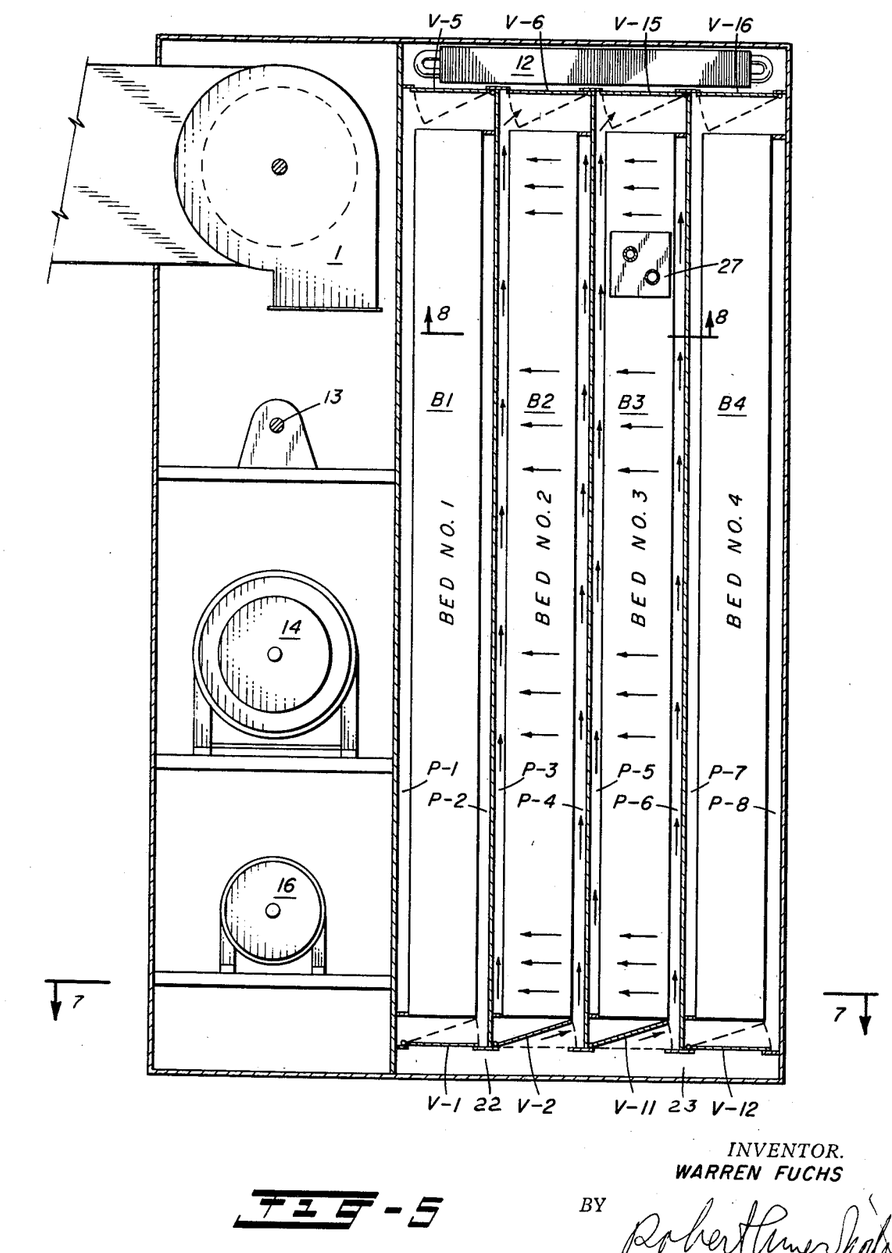
FIG. 5 is a cross section through FIGS. 4 and 7 along the line 5—5.
Figure 7:
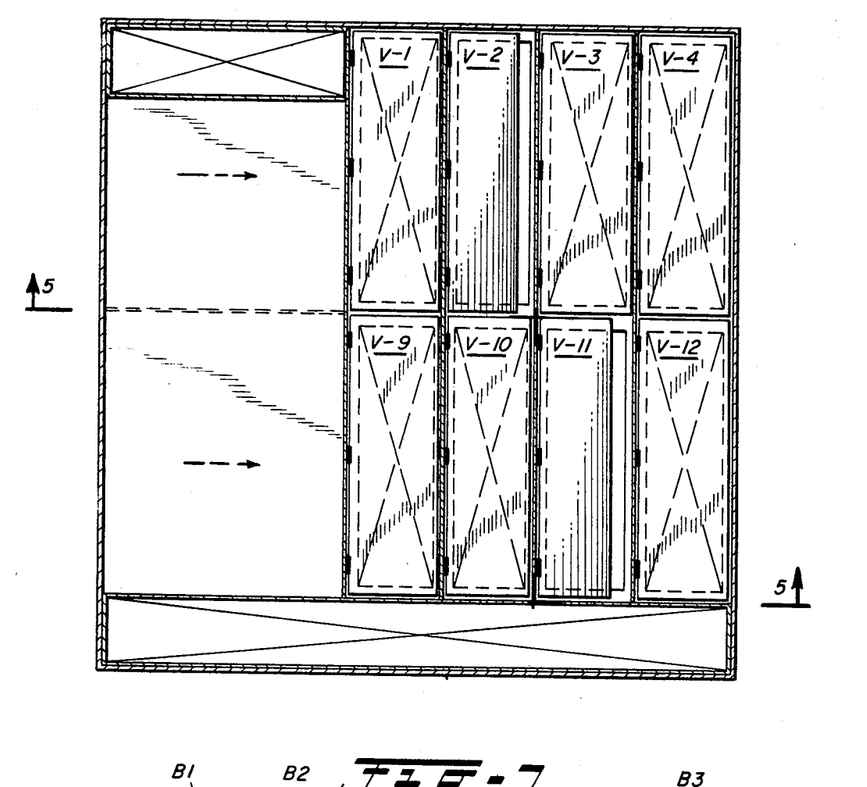
FIG. 7 is a horizontal cross section through FIG. 5 along the line 7—7.

Distribution valves to different beds are shown in FIGS. 4, 5 and 7. There are sixteen valves for a four-bed apparatus, as shown in FIGS. 4 to 8. These valves are numbered V–1 to V–16. FIG. 1 and FIGS. 4 to 8 represent a cycle shown in the top line of FIG. 3, in other words a cycle in which absorption is taking place in B–2 and B–3 is being cooled. The sequence of operating cycles in FIG. 3 shows the different cycles for operation at 7.5-minute intervals.

The portion of the submarine atmosphere being blown through heat exchanger 2 (FIGS. 1 and 6), using chilled water as a cooling medium, then passes through V–2, (FIGS. 5 and 7), into absorbing bed B–2, the beds being numbered B–1 to B–4. This flow can be seen more clearly in FIG. 5 and will be described in greater detail below in connection with the description of this figure.

All of the beds are filled with particles of high specific surface, such as granules of alumina gel of 10 to 14 mesh coated with potassium carbonate to the amount of roughly 10% by weight. The incoming level of carbon dioxide is normally 0.5% or lower and it, together with the water vapor in the air, reacts with the potassium carbonate to form potassium bicarbonate. The pressure drops through the beds are very low, at most a few inches of water, as the flow is crossways through each bed and there is, therefore, not a long path.

The major portion of the carbon dioxide is absorbed in B-2 and then passes on through valve V-14 (FIG. 4) to the main atmosphere of the submarine.

A portion of the air, controlled by a valve 3 (FIG. 1), passes into a transfer air blower 4, is cooled in a cooler 5, and then passes through the valve V-11 (FIG. 5) into B-3, which has just finished a heating cycle, as is shown in FIG. 3, and cools the bed down and is recirculated back through the blower 4. When cooling starts in B-3, the temperature of the bed is in excess of 300° F., for example about 320° F., and the use of water at ambient temperature in cooler 12 takes some of the load off the chilling unit 5 and, therefore, reduces to some extent the refrigeration load needed. The outflow from B-3 is through valve V-7, as is shown in FIG. 4. During the 7.5 minutes of operating cycle, bed B-2 will have absorbed $CO_2$ and bed B-3 will have been cooled down to absorption temperature.

While the cycle is proceeding, bed B-4 is being heated to give off $CO_2$ by transforming the potassium bicarbonate into potassium carbonate. This is effected, as will be described below in connection with FIG. 8, by electrical heating to a temperature above 200° F., preferably about 320° F. Because of the slower heat transfer from the electric heaters, each bed is heated for two operating cycles, or a total of fifteen minutes, to prevent heater burn-outs or other problems. This is clearly shown in FIG. 3 where two heating cycles in any one bed always preceded the cooling and absorption cycles.

Figure 2:
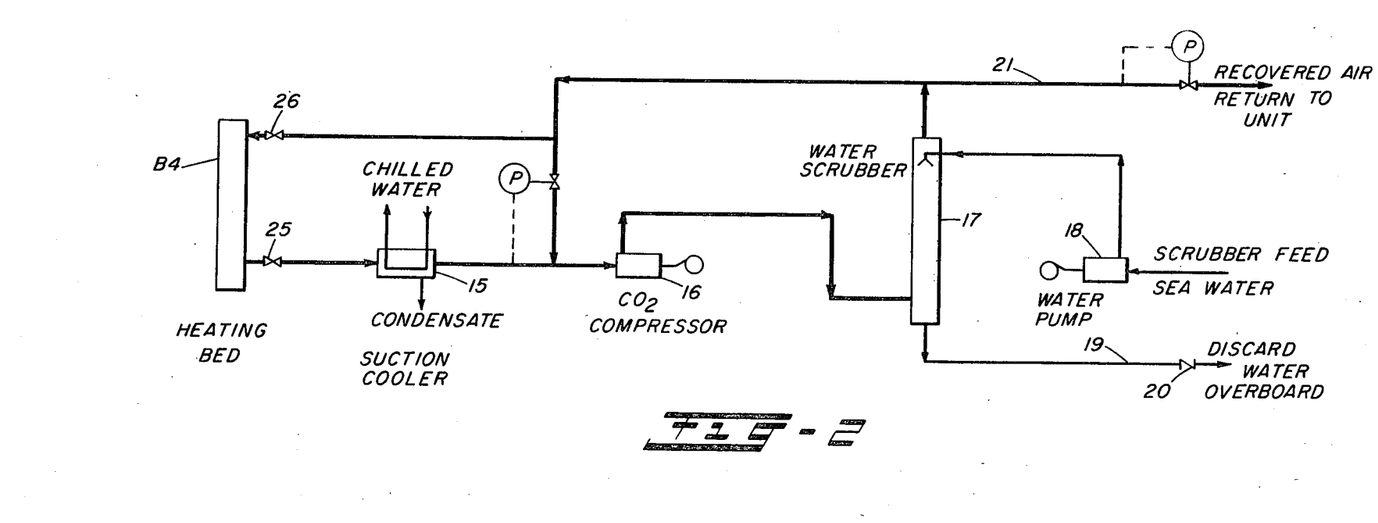
FIG. 2 is a flow sheet of the carbon dioxide disposal.

The $CO_2$ driven off from B-4 passes through valve 25, (FIG. 2), to a cooler 15 and thence into the intake of a compressor 16. In a similar manner, $CO_2$ valves (not shown) are provided for the other beds. The compressed $CO_2$ then passes into a sea water scrubber 17 through which water is circulated by the pump 18 and discharged overboard through the line 19, provided with the customary safety sea valve 20. The sea water, which could also be water from submarine's baths or other sources which produces water that can be wasted, absorbs the $CO_2$, and the small amount of oxygen and nitrogen which originally accompanied the $CO_2$ passes out through the line 21 into the atmosphere of the submarine. At the end of the heating cycle, valve 26 is opened briefly to cause some of the recovered oxygen and nitrogen to flow through B-4 and to purge it of all of the $CO_2$ in the interstices between the granules. Valves similar to 26 are provided for the other beds but are not shown.

A very compact four-bed apparatus is shown in FIGS. 4 to 8. The auxiliary cooling is at the top in the form of a cooler 12, which can be seen in FIGS. 1, 4 and 5.

FIGS. 5 and 6 show a general drive motor 14 which drives the $CO_2$ compressor 16 and also, through a shaft 13, the supply air fan 1 and the transfer fan 4.

The supply air is blown through the chiller 2, which in FIGS. 1 and 6 is shown only diagrammatically as its construction is a conventional cold water heat exchanger and the particular design forms no part of the present invention. Similarly, the transfer fan 4 blows air through a transfer air cooler 5, which is also shown only diagrammatically in FIGS. 1 and 6 for the same reason.

Figure 8:
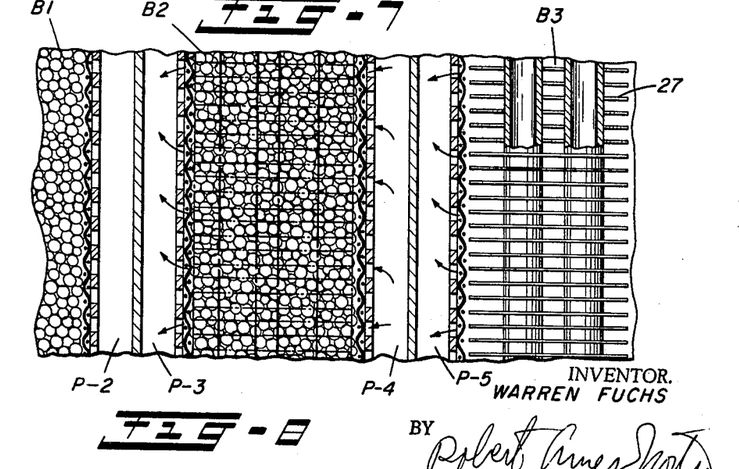
FIG. 8 is a horizontal cross section, on an enlarged scale, through FIG. 5 along the line 8—8.

The supply air enters a supply plenum 22 (FIGS. 5 and 6) and the transfer air into a transfer air plenum 23 (FIGS. 5 and 6). The direction of air flow can be seen in FIG. 5 into the beds B-2 and B-3 in the cycle which has been described above in conjunction with FIG. 1. The valves V-1 to V-16 are flat valves, as is shown in FIG. 5, and are actuated in sequence by a conventional valve sequencer (not shown). The flow of supply or transfer air is sideways through the beds, as is shown in FIGS. 5 and 8, and this requires side plenums, which, in FIG. 5, are labeled P-1 to P-8. The flow as illustrated for the top line of FIG. 3 is supply air entering through valve V-2 into P-4 flowing sideways through B-2 into P-3 and out through the valve V-14. The heater connections, which are finned tubes 27 are shown in only one set in FIGS. 5 and 8. Structural details of the beds and plenums appear in FIG. 8. FIG. 8 shows one bed full of granules and another empty in which the heater tubes appear more clearly. In FIG. 5 it will be seen that the transfer air for cooling bed B-3 enters P-6 through the valve V-11, passes sideways through bed B-3 into P-5 and out through valve V-7 (FIG. 4).

It will be seen that the construction shown in FIGS. 4 to 8 is a very compact one and is desirable particularly in submarines where space is always at a great premium. The construction is one which corresponds to the modification in FIG. 1 in which the submarine's fans are not used in the operation of the $CO_2$ removing system. All of the moving fans and moving parts are shown in the single unit, and this permits maximum compactness. It will be noted that FIGS. 4 to 8 do not show a sea water scrubber or scrubber with otherwise expendable or wastable water, as such scrubbers are of conventional design.

In some cases it has been considered desirable in the past to eliminate any absorption by sea water so as to minimize the numbers of openings to the outside water. In such a case, of course, the $CO_2$ compressed by the compressor 16 may be pumped directly overboard or otherwise disposed of. However, when this is done, alternative steps must be taken to limit the loss of the small amount of oxygen and nitrogen in the interstices between the granules supporting the potassium carbonate.

One such alternative is to remove the interstitial gases by vacuum prior to heating for regeneration. This alternative has three critical problems in that—(1) the subject chamber must then be designed for vacuum; (2) subjecting the bed alternatively to vacuum and then back to atmospheric pressure during each and every time cycle inevitably has a wearing and deterioration effect on the bed particles because of their alternative expansion and lifting when exposed to the vacuum and then compaction and settling when exposed to the pressure; (3) the chances for heater burnout are seriously aggravated when starting to heat a bed from a vacuum condition, the lack of gases in the interstices seriously restricting heat dissipation from the heater elements. A more suitable alternative is to work only at atmospheric pressure but to recover separately the first 10% of the gases evolved upon the application of heat during the regeneration period, this first 10% of the gases of course carrying the bulk of the interstitial nitrogen and oxygen or in effect representing a self purge as obtained from the initial portions of $CO_2$ and water vapor evolved. This first 10% of regenerator gases is then recycled back to that section of the apparatus working on the absorption period.

The invention has been described in conjunction with the preferred embodiment in which there are four beds containing the potassium carbonate. This is the most effective modification, but it should be understood that as far as the process aspects of the invention are concerned, it is possible to use a different number of beds, or even a single bed which absorbs part of the time, is cooled part of the time and is heated for removal of $CO_2$ the rest of the time. The use of multiple beds with sequencing is, however, so effective and compact that it will almost always be used, and for this reason is considered the preferred embodiment, although in its broadest aspects the process of the invention is not limited thereto.

In the alternative shown in FIG. 9, the ship's fans 9 and 10 are used for moving the gases and the ship's cooler 28 is used for final temperature adjustment. The elements which are the same as in FIG. 1 bear the same numerals. The only change is dividing the fan 4 into two fans 4A and 4B.

I claim:
1. A process for the removal of carbon dioxide from the atmosphere of enclosed spaces the atmosphere also containing fixed gases including nitrogen and oxygen which comprises, in combination,
   (a) contacting at least a portion of the atmosphere containing at least as much water vapor as carbon dioxide, with particulate carriers of large specific surface having distributed thereon alkali metal carbonate, the temperature of the contacting being not substantially above about 100° F. so that carbon dioxide of the atmosphere reacts with the alkali metal carbonate to form bicarbonate,
   (b) continuing the contacting until a major portion of the alkali metal carbonate has been transformed into bicarbonate and the rate of reaction with carbon dioxide has fallen off,
   (c) heating the bicarbonate to a temperature at which it decomposes into carbonate, water and carbon dioxide,
   (d) compressing the carbon dioxide and dissolving it in an aqueous medium, and
   (e) cooling the heated carriers to below about 100° F. by blowing thereover relatively dry cold air having a water vapor content not substantially in excess of that corresponding stoichiometrically to the carbon dioxide in the atmosphere contacting the carriers having distributed thereon the alkali metal carbonate.

2. A process according to claim 1 in which the alkali metal carbonate is potassium carbonate.

3. A process according to claim 2 in which the solution of compressed carbon dioxide is effected by a countercurrent scrubbing with the aqueous medium whereby carbon dioxide is dissolved and fixed gases which had occupied interstices between the particles of the particulate carrier coated with the potassium carbonate are freed from carbon dioxide and return said freed fixed gases to the atmosphere.

4. A process according to claim 3 in which the carbon dioxide is cooled to a temperature at least as low as 50° C. and separating the resulting condensed water before the compression preceding the counter current scrubbing with the aqueous medium.

5. A process according to claim 2 in which a plurality of beds of particles coated with potassium carbonate are used, the number being sufficient so that at least one is always reacting with carbon dioxide in the atmosphere, the sequence of carbon dioxide removal, heating to set free carbon dioxide and compressing it, and cooling with recirculated relatively dry cold air is timed to a predetermined sequence of cycles whereby a continuous process results.

6. A process according to claim 5 in which the heating cycles are effected by transfer of heat to the bed from the outside and the heating cycle is longer than the carbon dioxide absorbing cycle or cooling down cycle, the heating cycle being sufficiently long so that local overheating of parts of the bed of potassium carbonate coated particles is avoided.

7. A process according to claim 6 in which the heating cycles is approximately twice as long as absorbing and cooling cycles.

8. A process according to claim 6 in which the atmosphere is in a submarine, the scrubbing of the compressed carbon dioxide is with waste water and the solution in the waste water is pumped into the surrounding sea.

9. A process according to claim 8 in which the contacting of a portion of the air in the submarine to beds on the carbon dioxide absorption cycle and the cooling by recirculation of relatively dry, cold air is effected by separate blowing means.

10. A process according to claim 9 in which the air contacted with the carbon dioxide absorbing bed and the cold air for cooling down is effected by indirect heat exchange of the two airs with chilled liquid cooled to a temperature substantially below ambient temperature in the submarine atmosphere.

11. A process according to claim 8 in which the portion of the submarine's air contacting a bed absorbing carbon dioxide is effected by the circulation of the submarine's ordinary air circulating means.

References Cited

UNITED STATES PATENTS

| | | | |
|---|---|---|---|
| 496,546 | 5/1893 | Walker | 23—150 |
| 1,831,731 | 11/1931 | Al | 23—2 |
| 3,042,497 | 7/1962 | Johnson et al. | 23—4 X |
| 3,100,685 | 8/1963 | Duffey | 23—150 |

OSCAR R. VERTIZ, Primary Examiner

E. C. THOMAS, Assistant Examiner

U.S. Cl. X.R.

23—2, 150